United States Patent [19]

Dick

[11] 4,282,744

[45] Aug. 11, 1981

[54] LEAK TESTING HERMETICALLY SEALED ELECTRONIC ARTICLES

[75] Inventor: Bernard M. Dick, Lee's Summit, Mo.

[73] Assignee: Western Electric Co., Inc., New York, N.Y.

[21] Appl. No.: 90,799

[22] Filed: Nov. 2, 1979

[51] Int. Cl.³ .............................................. G01M 3/16
[52] U.S. Cl. ...................................... 73/49.3; 73/40.7
[58] Field of Search ........................... 73/49.3, 52, 40.7

[56] References Cited

U.S. PATENT DOCUMENTS

| | | | |
|---|---|---|---|
| 2,412,192 | 12/1946 | Agnew | 73/52 |
| 3,416,359 | 12/1968 | Durbin et al. | 73/40.7 |
| 3,738,158 | 6/1973 | Farrell et al. | 73/40.7 |
| 3,802,251 | 4/1974 | Durr | 73/49.3 |
| 3,888,111 | 6/1975 | Craig | 73/40.7 |
| 4,154,092 | 5/1979 | White et al. | 73/49.3 |
| 4,158,960 | 6/1979 | White et al. | 73/40.7 |
| 4,164,703 | 8/1979 | Boggs et al. | 324/54 |

FOREIGN PATENT DOCUMENTS 823325  1/1938  France .......................................... 73/52

*Primary Examiner*—Gerald Goldberg
*Assistant Examiner*—Joseph W. Roskos
*Attorney, Agent, or Firm*—W. O. Schellin

[57] ABSTRACT

Hermetically sealed electronic articles (11) such as, for example, diodes are leak tested by exposing the articles to a fluid (28) under pressure. The fluid is capable of altering the electrical characteristics of the articles to a value outside of an acceptable range of values upon penetrating through faulty hermetic seals of the articles (11). After such exposure the articles (11) are routinely tested and the articles with values of their characteristics outside the range of acceptable values are identified or discarded. Ethylene glycol is an example of a preferred fluid (28) in that it has conductive properties which significantly increase the reverse bias leakage current of the diodes.

11 Claims, 4 Drawing Figures

FIG.-3
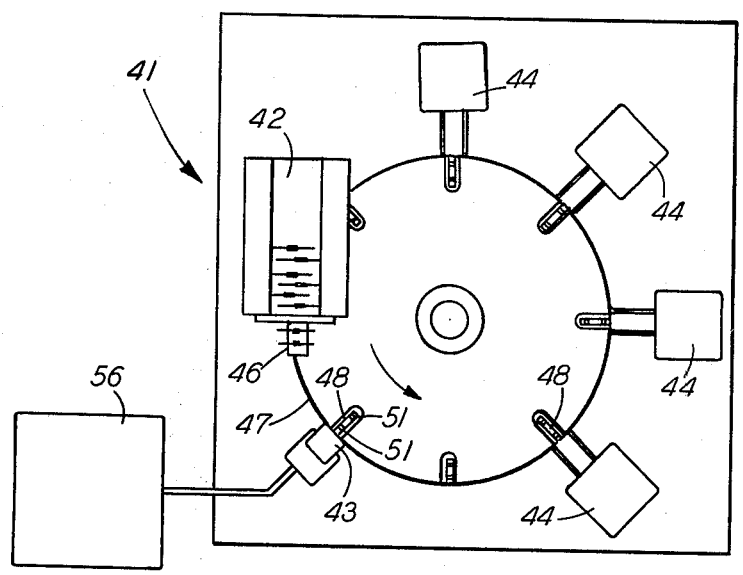
FIG.-4

LEAK TESTING HERMETICALLY SEALED ELECTRONIC ARTICLES

TECHNICAL FIELD

This invention relates to leak testing hermetically sealed articles. The technical field of the invention extends particularly to various hermetically sealed semiconductive articles, the quality of which needs to be ensured by reasonable and economic testing procedures. A particular example of a semiconductive article on which the invention has an advantageous impact is a low cost, mass produced diode. The invention is described with respect to such a diode.

BACKGROUND OF THE INVENTION

One of the advantages brought about by the introduction of semiconductor technology is an increased useful life of semiconductor devices over their prior art vacuum tube equivalents. It is, however, well known to those familiar with the semiconductor art that semiconductor devices can be rapidly destroyed by exposure of their active surfaces to atmospheric conditions while such devices are in operation. Quality semiconductor devices are, consequently, routinely shielded from environmental conditions by an application of passivation layers over active surfaces, and, in many cases, by hermetically sealing device packages which ultimately house the devices.

Hermetically sealed housings, envelopes or packages of articles which contain complex and relatively expensive integrated circuits are routinely leak-tested by sophisticated instruments. The tests involved the use of radioactive gases as a vehicle to detect leaks in the packages. A relatively high cost of the involved instruments is justifiable because of the inherent value and the functional important of such integrated circuits. On the other hand, simple, low cost transistors or diodes are not routinely subjected to such leak tests involving radioactive gases and sophisticated instrumentation.

Because of an ever-present requirement for price competitiveness of low priced devices, a leak test tends to be looked upon as disproportionately raising the cost of the product without significantly enhancing its statistical quality. Consequently, leak tests, even gross leak tests, as a routine step frequently tend to be bypassed in the production of low cost devices. As a result, any lot of such low cost devices may include a certain number of devices which tend to have a comparatively shorter useful life before failure.

In the manufacture of axially leaded diodes which are housed in hermetically sealed glass sleeves and which are intended to be used in electrical circuits of apparatus with high lifetime requirements, a statistically acceptable sampling plan is employed. A portion of all manufactured diodes is subjected to a gross leak test by which inadequately sealed diode housings are detected. To conduct the test, the diodes are placed in a pan and submersed in a liquid dye which fluoresces when irradiated by a black light source. The pan is loaded into a pressure chamber and subjected to a pressure of 1000 psi for approximately one hour.

Thereafter the dye is rinsed from exposed portions of the diodes, and the diodes are visually inspected under a microscope with a typical 20× magnification while being illuminated with a black light source. When viewed under these conditions, defectively sealed diodes appear illuminated by small remaining dye portions which have penetrated into the diode housing during the pressurization period and have remained there after the rinsing operation. Typical quality specifications may call for complete inspection by the above visual test of all manufactured diodes when more than eight diodes are detected as being defective in a typical lot of six thousand diodes.

Of course, optical inspection of small devices, such as the diodes, is cumbersome and time consuming and, hence, expensive. Such expense, even when incurred only on statistical samples, adds to the cost of the final product. A low cost leak test is therefore desirable, since the routine electrical tests to which all of the diodes are subjected prior to shipment do not detect a defective hermetic seal of a housing unless a particular device fails already during testing because of a defective seal. Unfortunately, the effects of a defective seal typically show up only after a prolonged operation, at which time the diodes have found their way into an intricate piece of apparatus, and a failure at that time can be catastrophic.

SUMMARY OF THE INVENTION

It is, consequently, an object of the invention to routinely test hermetically sealed electronic articles for leaks with a minimum of added cost to an existing manufacturing process. A more specific object is to test hermetically sealed electronic articles for leaks by an automatic process using a minimum amount of operator time.

According, a method of testing a hermetically sealed electronic article in accordance with this invention includes subjecting the article to an impregnating environment of a fluid capable of affecting the electrical characteristics of the article. Thereafter, a test is performed on the article to detect an electrical characteristic which is indicative of the presence of the fluid within the envelope and, hence, of a leaky seal or envelope.

BRIEF DESCRIPTION OF THE DRAWING

The following detailed description will be better understood when reference is made to the accompanying drawing, wherein:

FIG. 3 is a typical test apparatus which may be used to test articles, such as the one shown in FIG. 1, in accordance with the present invention; and FIG. 4 is a diagram of typical steps which may be taken in performing a test according to the present invention.

DETAILED DESCRIPTION

Figure 1:
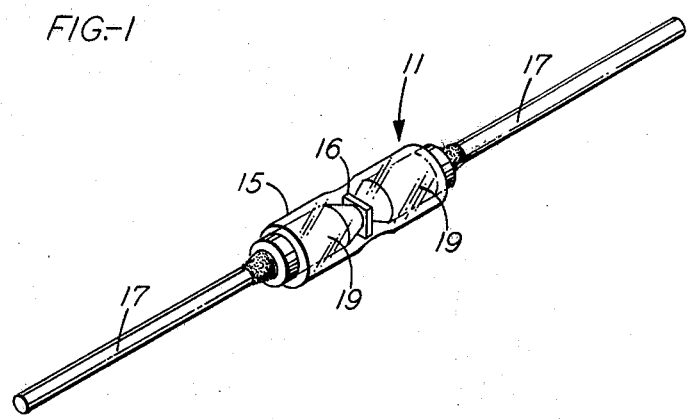
FIG. 1 is a pictorial view of a typical article which is advantageously tested in accordance with the present invention.

FIG. 1 depicts a semiconductor diode 11 as a typical example of an electronic article to which a test conducted in accordance with this invention advantageously applies. However, many of the advantages and features of this invention also apply to other electronic articles, as will become apparent from the following detailed description. The description of the invention with reference to the diodes is for illustrative purposes only and should not be construed as a limiting factor on the scope of this invention.

The term "electronic article" is used herein to denote a circuit component having at least two terminals which permits such component to be coupled, connected, soldered or otherwise functionally placed into what is commonly referred to as an electric or electronic circuit. The component itself may include a combination of elements, but should include at least one such element having an electrical function within such electric or electronic circuit. Typical such elements, beside diodes, include for example, integrated circuits, transistors, resistors and capacitors and further include similar non-semiconductive elements.

The article 11 shown in FIG. 1 has a central body, which is a package or envelope 15 for an electronic element, in the particular example a diode chip 16. Two axial leads 17 extend from the envelope 15 in a manner typical to most diode assemblies. The envelope 15 of the exemplary article 11 is, but need not be, formed of a cylindrical glass tube. The leads 17 penetrate opposite ends of the envelope 15, and within the envelope 15 the diode chip 16 is mounted between inner ends 19 of the leads.

The inner ends 19 of the leads 17 are typically slightly larger in diameter than the outer extending portions of the leads 17 themselves. Typically, the inner ends 19, particularly such portions which are in intimate contact with the envelope 15, are made of molybdenum or of a material known as Dumet. The coefficient of thermal expansion of these materials is sufficiently compatible with that of glass to permit a hermetic seal to be formed between the ends 19 and the glass envelope 15. The methods of making the exemplary articles 11 are well known. The ends 19 are assembled within the envelope 15 against opposite major surfaces of the chip 16 and the assembly is heated in a controlled inert atmosphere to permit the glass of the envelope 15 to soften and form a seal between its inner wall and each of the ends 19. After the article 11 has cooled to room temperature the assembly thereof is complete.

Figure 2:
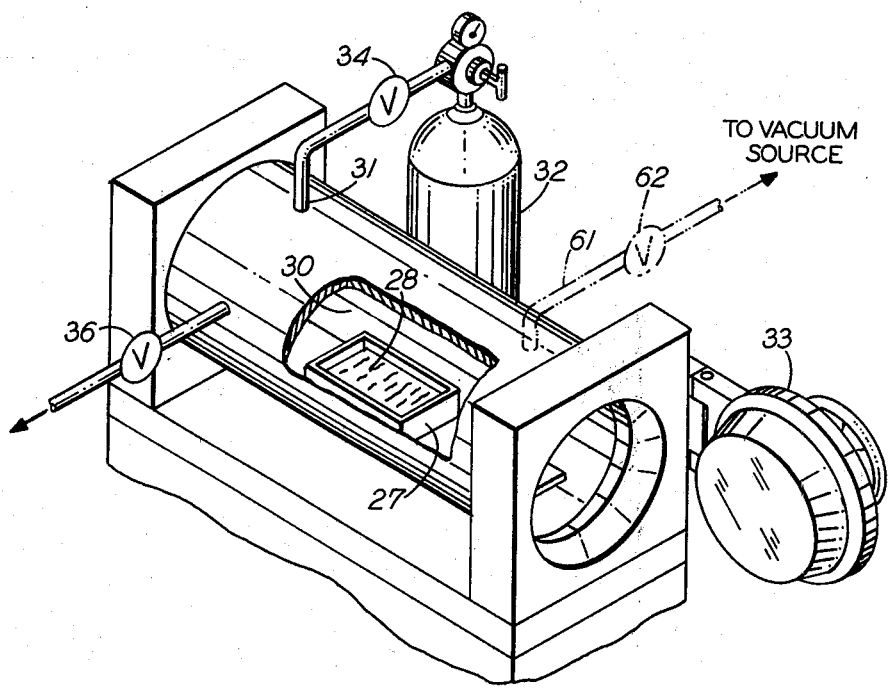
FIG. 2 is a cutaway view of a typical pressure chamber for impregnating articles, such as the one shown in FIG. 1, to prepare such articles for an electrical test in accordance with the present invention.

FIG. 2 shows a partially broken away, somewhat schematic view of an apparatus 26 involved in preparing a plurality of the articles 11 for a leakage test in accordance with this invention. After the articles have been assembled, a lot or batch of the articles 11, typically in the order of 5,000 to 10,000, are placed into a container or pan 27 of a liquid substance referred to as test fluid 28. The test fluid 28, in addition to possessing relatively inert chemical characteristics with respect to the assembled articles 11, desirably has a relatively low electrical resistivity. In other words, the fluid 28 has the ability to conduct electricity. A suitable substance having these characteristics is a commerical grade of ethylene glycol. The amount of ethylene glycol as the test fluid 28 in the pan is chosen to be sufficient to completely cover the articles 11 therein.

The pan 27 is thereafter loaded into a chamber 30 capable of being pressurized. The chamber 30 is connected through appropriate piping 31 to a reservoir or source 32 of compressed gas such as nitrogen. The source 32 includes such typical safety and control hardware items as, for example, a pressure regulator, a safety relief valve and pressure gauges. These items are considered to be part of the source and are not pointed out separately. After the pan 27 has been loaded into the chamber 30 and a cover or door 33 has been locked to withstand positive pressure, an inlet valve 34 is opened to pressurize the chamber 30.

As in a similar, prior art sampling process of the articles 11 during which the articles become immersed in a fluorescent dye activated by black light, the articles 11 become subjected to the test fluid 28 at a typical pressure of 1000 psi for approximately one hour. Any positive differential between a pressure applied through the fluid 28 and the relatively lower pressure inside the envelope 15 is considered to be an impregnating environment for purposes of this invention, if such a pressure differential is sufficient to permit the fluid 28 to penetrate into the envelope 15 of an insufficiently sealed article 11. Under the pressure of the exemplary environment, the test fluid 28 is forced through any crevices or passages which may be remaining between the lead ends 19 and the glass envelope 15 into the article 11 to contact and coat the lead ends 19 and the chip 16. In coating the lead ends 19 and the chip 16 of any article 11 having such passages, the characteristic low resistivity of the ethylene glycol as the test fluid 28 establishes a bridging electrical path within the envelope 15 to extend in parallel with the chip 16. After the articles have been exposed to the pressurized fluid 28 for what is considered to be a sufficiently long time, such as, for example, the one hour period, the gas within the chamber is vented through a valve 36 to return the pressure in the chamber 30 to atmosphere pressure.

The articles 11 are subsequently removed from the chamber 30, and residues of the fluid 28 are washed away from external surfaces of the articles 11 in a typical rinsing and drying operation. Such a rinsing operation is important because any remaining residues of the ethylene glycol as the exemplary test fluid 28 tend to establish an external electrical path between the leads 17 in parallel to the chip 16 on all of the articles 11. However, the ready solubility of ethylene glycol in water is advantageous to ensure complete removal of such residues in a simple rinsing operation without the use of special apparatus or special precautions.

According to the prior art sampling plan, each diode to be sampled for a leaky envelope 15 had to be inspected by an operator on an individual basic before those which passed the inspection were routed to an automated final testing operation. In contrast to the prior art sampling plan, the articles exposed to the pressurized fluid 28 are now routed directly to the final testing operation.

FIG. 3 depicts typical apparatus designated generally by the numeral 41, by which the articles 11 are automatically handled and tested during the final testing operation. Various types of such apparatus are used in the industry, many of which may include or delete various special features. The apparatus 41 shows major features used in conjunction with the testing of the articles 11.

Typically, the articles 11 are fed sequentially from a magazine 42 to a test station 43. From the test station 43 the articles 11 are routed past two or more discharge bins 44 which are used to separate the articles 11 into groups such that the articles within each group have similar electrical characteristics. Some of such groups categorize faulty articles according to particular defects. Such grouping is useful in identifying possible process difficulties.

Since the leads 17 of the articles 11 are of a magnetic material and extends axially, the magazine 42 is preferably a commonly known magnetic handling bin. Other types of magazines may, of course, be used and may be preferred with respect to processing articles 11 of different physical configurations.

Feeding and advancing the articles 11 is also accomplished by conventional techniques. A typical magnetic feed wheel 46 transfers the articles 11 to a feed table 47. Incremental or stepwise advancing motion of the feed table 47 is preferred. The feed table 47 has evenly spaced nests or holders 48 which advance the articles 11 in sequence into alignment with, and the leads into contact with, a pair of test terminals 51 at the test station 43.

At the test station 43 the electrical characteristics of the articles 11 are compared to certain, predetermined parameters. In the case of diodes, such as the exemplary one shown in FIG. 1, tests would typically include a determination of which one of two possible orientations the article 11 in the holder 48 has. Other typical tests determine forward impedance and reverse bias leakage current characteristics as well as capacitances which affect switching times.

The determination of the reverse bias leakage current of the articles 11 has been found to be an excellent test to determine whether the fluid 28 has penetrated through the seals between the ends 19 and the envelope 15. Typical reverse bias leakage currents of acceptable articles 11, e.g., diodes, with respect to which this invention is described, ranged between $5 \times 10^{-9}$ and $1 \times 10^{-6}$ amps, a more specific range depending on what specific types of diodes are being tested.

It has been found that such an article 11 which would also be detected by the prior art dye sample plan as having a leaky seal could readily be identified as a reject during the reverse bias leakage test after the above-described immersion in the test fluid 28 in accordance with this invention. Typically, the reverse bias leakage current in leaking diodes has been found to increase by two to three orders of magnitude. Consequently, reverse leakage current characteristics of the rejected articles 11 range typically between $5 \times 10^{-6}$ and $5 \times 10^{-4}$ amps, as compared to $5 \times 10^{-9}$ and $1 \times 10^{-6}$, respectively. The reverse bias leakage test is performed by a typical commercially available test set 56. It should be noted, however, that while in the exemplary description of the invention no change in the available prior art test set was necessary, for other types of the articles 11 an existing test set may need the addition of a current test between two leads which typically were not intended to be subjected to such a test. It is understood that in most existing test sets such modifications are made in a routine manner.

A flow diagram in FIG. 4 summarizes the manufacturing and testing process as described above. The impregnation or saturation, rinse and drying steps, also referred to as exposure steps, which have been added between the prior art assembly and the final electrical testing methods, sensitize those of the articles 11 which have leaky seals to permit such articles to be detected and sorted out as faulty product by the routine final testing methods. Preferably the exposure steps are applied to all assembled product. The exposure steps are typically mass handling steps which require little additional manipulation. Consequently the sequence outlined in FIG. 4 does not add any significant cost to the articles 11 as the final product.

Various changes can be made in the elements of the outlined methods which should be considered to clearly be within the scope of this invention. For instance, a significant characteristic of the fluid 28 is that it has the capability of altering at least one electrical characteristic of the article 11. With respect to testing the diode of FIG. 1 as a typical article 11, ethylene glycol was found to have a sufficiently high conductivity to significantly affect reverse leakage characteristics of the diode. It is again pointed out, that an electrical test to detect an improperly sealed article may have to be added as, or in addition to, an already existing, automatic final test. For instance, the fluid 28 may establish an electrical continuity between two normally completely isolated electrical terminals.

In a further modification of the described methods the articles 11 may be pretested to establish their precise electrical characteristics prior to the exposure steps. The final testing following the described exposure steps compares its results with the results of the pretest of the articles. While such a procedure increase the cost of the articles 11, the increase may be considered reasonable, particularly inasmuch as the added test is also an automated operation.

In some instances the use of a fluid 28 other than ethylene glycol may be advantageous. It has, for example, been pointed out above that a desirable characteristic of the test fluid is its inertness, e.g., its inability to react with and change the appearance of characteristics of the lead 17, the material of the lead ends 19, the glass envelope 15, or the assembly in general. However, it should also be realized that such an inert behavior is no longer necessary, once the fluid has penetrated through a defective seal into the envelope 15. A chemical reaction on the inside of the envelope to change detectable characteristics therein may be as desirable as the described ability of the fluid 28 to change or establish an electrical path.

Also, the length of exposure of the articles 11 to the fluid 28 under pressure, and the pressure to which the articles 11 are exposed may desirably be varied with respect to articles 11 other than the referred to diodes. For example, some metal transistor cans (not shown) have envelopes or cans which are larger than the envelope 15 of the article 11. Such larger cans may have the tendency to collapse under the preferred pressure of 1000 psi. Such articles are, consequently, subjected to a pressure which is appropriately lower than the described typical pressure of 1000 psi. To ensure proper penetration of the fluid 28 into insufficiently sealed envelopes 15, the time of exposure of the articles 11 at such lower pressures may have to be increased. Appropriate pressures and exposure times are necessarily dependent on some experimentation.

Such experimentation may be performed by deliberately inducing improper seals, e.g., by contaminating mating surfaces to prevent bonding, or by lowering the temperatures or decreasing exposure times at which glass seals are formed. In the case of the diodes referred to herein, insufficiently sealed envelopes 15 were then subjected to detailed testing in accordance with the described methods and according to prior art visual recognition methods.

In some instances in which the physical strength of the envelope 15 is deemed to be insufficient to withstand the typical pressure of 1000 psi, the effect of a lower applied pressure may be enhanced by subjecting the articles 11 to a reduced pressure, commonly referred to as vacuum or partial vacuum, prior to exposing the articles to the increased pressure. FIG. 2 shows in phantom lines an addition as an alternate embodiment, a vacuum line 61 in communication with the chamber 30. A vacuum valve 62 permits a selective disconnection of a typical vacuum source (not shown) from the chamber 30 during times when the vacuum is not desired in the chamber 30.

In addition to the described preparation to aid the conductive fluid 28 to penetrate the envelopes 15 of insufficiently sealed articles 11, it may become desirable to subject the articles 11 to mechanical vibration such as, for example, ultrasonic vibration. Such vibration could be applied either after the exposure to the fluid 28 or even during such exposure. Vibrating the articles after the fluid 28 enters such insufficiently sealed envelopes 15 is believed to aid in the distribution of the fluid 28 over usually nonconductive surfaces within the envelope 15 to bring about a change in the electrical characteristics by establishing a path between selected terminals such as the leads 17.

It is apparent that various other changes and modifications can be made with respect to the disclosed embodiments and procedures without departing from the spirit and scope of the present invention.

What is claimed is:

1. A method of leak testing a hermetically sealed electronic article, which comprises:
   immersing the article into a fluid having an electrical conductivity capable of affecting a functional electrical characteristic of the article upon penetration of such fluid into an envelope of the article;
   raising the pressure of the fluid to increase the tendency of the fluid to penetrate through crevices into the envelope; and
   testing the functional electrical characteristics of the article across at least two terminals of the article, such test being indicative of the fluid having penetrated into the envelope.

2. A method according to claim 1, wherein the fluid is ethylene glycol and the method comprises:
   rinsing the article in water to remove residues of ethylene glycol from exposed surfaces of the article; and then
   drying the article prior to testing the article to ascertain its electical characteristics.

3. A method according to claim 1, wherein the electronic article is a semiconductor article capable of sustaining a voltage across a reverse biased junction upon an application of a test voltage across at least two terminals of the article; and
   testing the functional electrical characteristic of the article comprises placing a reverse bias voltage across such terminals and measuring a reverse leakage current across the respective reverse biased junction, wherein a leakage current is measured solely through the reverse biased junction when the article is not affected by the conductive fluid, and a current through said conductive path and through the reverse biased junction is measured when the fluid has penetrated into the envelope, such that an excess in the reverse leakage current becomes indicative of the fluid having penetrated into the envelope.

4. A method according to claim 3, wherein the semiconductive article is a diode, the envelope is a glass sleeve and the terminals are leads extending from a contact with opposite surfaces of a semiconductor chip within the glass sleeve through the glass sleeve and testing the article comprises measuring the current through the diode when the diode is reverse biased and comparing the magnitude of the measured current to an acceptable, predetermined reverse leakage current for the diode, a leakage current in excess of such acceptable leakage current being indicative of the fluid having penetrated through crevices between the leads and the glass sleeve and having come into contact with the chip within the sleeve.

5. A method according to claim 4, wherein subjecting said diode to a fluid comprises immersing said diode into a quantity of ethylene glycol; and
   subjecting said quantity of ethylene glycol to an increased pressure, such pressure capable of urging the ethylene glycol into any crevices between the glass sleeve and the leads to contact the chip within the sleeve.

6. A method of leak testing hermetically sealed electronic articles comprising:
   immersing the articles into a fluid having an electrical conductivity capable of altering the electrical characteristics between terminals of said articles upon penetrating through crevices into such articles;
   increasing the pressure of the fluid against the articles above atmospheric pressure for a predetermined period of time;
   vibrating the articles to distribute any amount of the fluid which may have penetrated into the articles within such articles to increase the effect of the fluid on the electrical characteristics of such articles;
   testing the articles across at least two terminals of the articles to ascertain the electrical characteristics of the exposed articles; and
   identifying those of the articles having such altered electrical characteristics in accordance with the results of such testing.

7. A method according to claim 6, which comprises:
   pretesting the articles prior to exposing them to the fluid to establish a standard range for the electrical characteristics of the articles; and
   comparing the results of the testing after the articles have been exposed to the fluid to said standard range.

8. A method according to claim 6, wherein vibrating the articles comprises ultrasonically agitating the articles.

9. A method according to claim 8, wherein ultrasonically agitating the articles comprises agitating the fluid while the articles are immersed therein.

10. A method according to claim 9 which comprises agitating the fluid while the pressure of the fluid is increased above atmospheric pressure.

11. A method according to claim 6, which further comprises
   subjecting the articles to a partial vacuum prior to increasing the pressure of the fluid.

* * * * *